United States Patent [19]

Patel

[11] 4,089,618
[45] May 16, 1978

[54] FAN WITH NOISE REDUCTION

[75] Inventor: Jay Patel, Kingston, N.Y.

[73] Assignee: Rotron Incorporated, Woodstock, N.Y.

[21] Appl. No.: 655,550

[22] Filed: Feb. 5, 1976

Related U.S. Application Data

[63] Continuation of Ser. No. 485,289, Jul. 2, 1974, abandoned.

[51] Int. Cl.² .............................................. F04D 29/38
[52] U.S. Cl. .................................. 416/228; 416/236 A
[58] Field of Search ................... 416/228, 236, 236 A; 415/119, 235

[56] References Cited

U.S. PATENT DOCUMENTS

| | | | |
|---|---|---|---|
| 1,717,745 | 6/1929 | Tismer | 416/231 X |
| 1,861,065 | 5/1932 | Poot | 416/235 |
| 2,013,473 | 9/1935 | Meyer et al. | 416/228 X |
| 2,238,749 | 4/1941 | Peltier | 416/203 |
| 2,532,753 | 12/1950 | Beman | 416/235 X |
| 2,899,128 | 8/1949 | Vaghi | 416/236 A X |
| 3,776,363 | 12/1973 | Kuethe | 416/235 X |
| 3,779,338 | 12/1973 | Hayden et al. | 416/228 X |

FOREIGN PATENT DOCUMENTS

| | | | |
|---|---|---|---|
| 719,758 | 2/1932 | France | 416/236 A |
| 1,399,801 | 4/1965 | France | 416/228 |
| 530,421 | 7/1955 | Italy | 416/228 |
| 774,396 | 5/1957 | United Kingdom | 416/236 A |

Primary Examiner—Everette A. Powell, Jr.
Attorney, Agent, or Firm—Brumbaugh, Graves, Donohue & Raymond

[57] ABSTRACT

A fan for moving a gaseous fluid, e.g., air, is described in which the high audible frequency noise resulting from the phenomenon occurring at the trailing edges of the blades, known as vortex shedding, is reduced. This is accomplished by notching an edge of each of the blades so that the pattern of vortices leaving the blade, which causes the noise, is disturbed and a turbulence condition engendered. The turbulence distributes the pressure fluctuations resulting from movement of the blades through the fluid over a relatively broad band of frequencies and reduces the annoying noise frequencies. Various notch configurations are disclosed.

8 Claims, 5 Drawing Figures

U.S. Patent  May 16, 1978  4,089,618
FIG.1  FIG.2
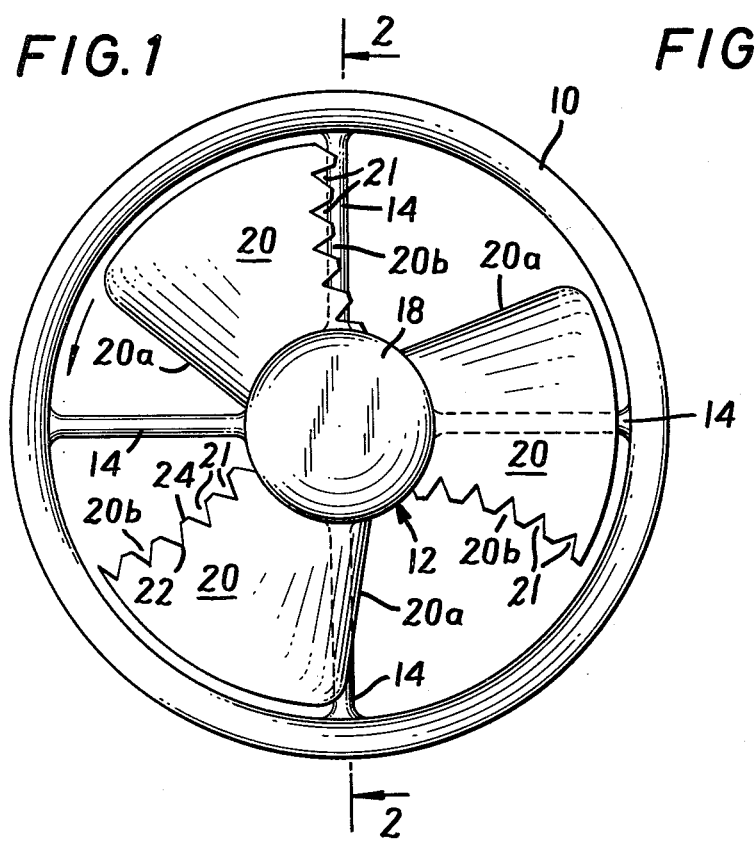
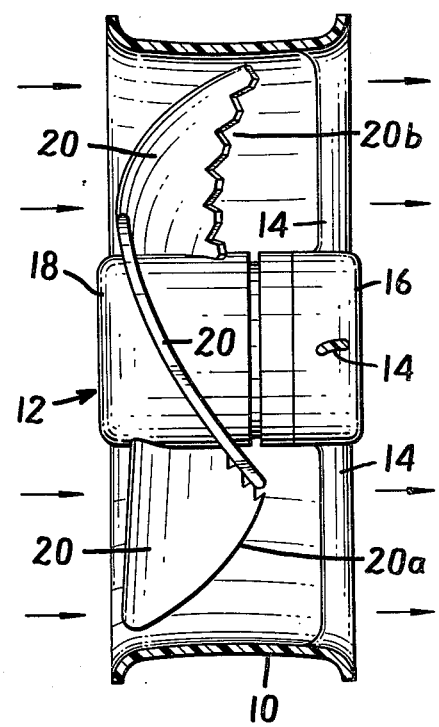
FIG.3  FIG.4
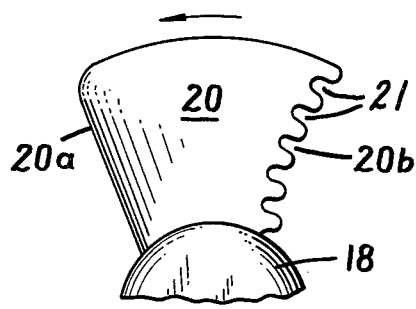
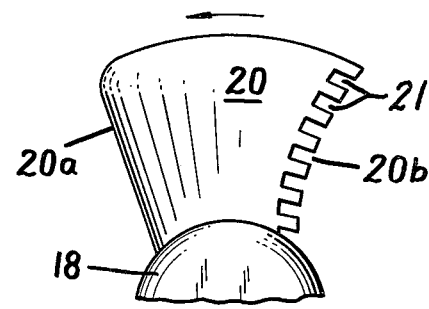
FIG.5
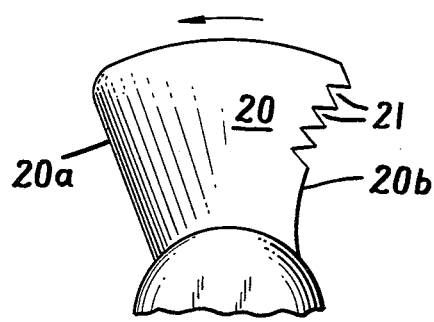

FAN WITH NOISE REDUCTION

This is a continuation of application Ser. No. 485,289, filed July 2, 1974, now abandoned.

The present invention relates to the reduction of noise in devices for moving air or other gaseous fluids, and more particularly, to means for reducing noise caused by the passage of fan blades through a gaseous medium.

In fans or similar devices, the rotation of one or more blades through a gaseous medium, e.g., air, to create a flow of the medium, sometimes gives rise to audible noises that are objectionable if not intolerable. For example, in large electronic installations such as electronic computer systems, many small fans are employed in the computer cabinets to cool the electronic components housed within them. If such fans generate appreciable amounts of noise, personnel using the computer are disturbed and their efficiency impaired. It is apparent that in this, as well as other environments, the reduction of unwanted and irritating noise is a salutary achievement.

The noises associated with fans or blowers may be grouped into two broad categories. The first of these encompasses those due to the components responsible for causing rotational movement of the blades or impeller. In these components, such as the motor and bearing assemblies, noise is generated primarily by the impact or relative movement of mechanical elements. The second category encompasses those noises created by the movement of air or other fluid caused by rotation of the fan blades.

The latter category includes what is known as "blade passing noise", which arises in those fans in which the blades rotate in proximity to mechanical elements, such as struts which support the fan structure relative to some housing or shroud. As each blade passes a strut, a pressure variation occurs which, when multiplied by the number of blades, the number of struts, and the speed of rotation of the fan blades, may create an audible noise of appreciable and annoying volume. Several factors contribute to the generation of blade passing noise, such as the geometric relationship of the blade edges with respect to the struts, the number of blades and struts, the shape of the struts themselves, etc. and this noise is controllable to a tolerable degree by manipulation of those factors.

In some types of fans, the aerodynamic relationships present give rise to another noise output, often at a pitch relatively high in the audible spectrum, which can be of sufficient intensity to become particularly annoying. This noise is referred to as vortex noise and occurs as a result of what is termed "vortex shedding", i.e., a phenomenon resulting from air leaving the trailing edges of the blades during operation in the form of vortices or swirls. The vortex pattern may cause pressure fluctuations at frequencies and intensities within the audible range.

While the existence of this phenomenon and the resulting noise are known in the art, relatively little attention has been paid to them in the past. In many fans, because of the characteristics of the fan itself, the vortex noise may be at a frequency or of an intensity such that it does not warrant special attention or is masked by other noises of the fan. Where vortex noise is a factor, it heretofore has been suggested to minimize the noise by making the blade surfaces, in particular, the surfaces adjacent the trailing edges of the blades, of a porous material, the purported effect of which was to prevent or reduce the creation of vortex flow of the gas leaving the blade edge.

The primary solution to the problem thus far, however, has been to avoid operating conditions which could cause such noise. Since vortex noise is a function of the operating condition of the fan and occurs only when the fan is operated at certain portions of its pressure vs. flow characteristics, fan manufacturers specify the suggested operating ranges of a fan to exclude those portions of its characteristic that give rise to vortex noise. Operating within these ranges will avoid the noise problem, but at the same time, will limit the utility of the fan.

The object of the present invention is to provide for reduction of vortex noise by simple, reliable means and thereby enable a given fan to be used at any part of its characteristic without giving rise to annoying vortex noises.

Briefly, in accordance with the invention, the vortex flow normally engendered at the trailing edge of a moving fan blade and which, under normal operating conditions of the fan, would give rise to pressure fluctuations at an audible frequency, is broken up by providing irregularities in the edges of the blades. These irregularities may take the form of notches arranged longitudinally along the blade edges from tip to root and may be V-shaped, U-shaped, rectangular, etc. The effect of these notches is to create a mixture of vortices leaving the blade edge at different points and in different directions. This engenders a turbulence condition at the blade trailing edge, the pressure fluctuations of which occur over a relatively wide range of frequencies. Consequently, the particularly annoying high pitched vortex noise is significantly reduced in intensity, making use of the fan at the conditions that ordinarily gave rise to such noise, quite satisfactory.

The foregoing and other objects, features and advantages of the invention will become more apparent from the following detailed description of a preferred embodiment of the invention, taken in conjunction with the accompanying drawings, in which:

FIG. 1 is a front elevation of a fan employing the present invention;

FIG. 2 is a side elevation, in partial cross section, of the fan of FIG. 1;

FIGS. 3 and 4 illustrate alternate forms of notching usable in the fan of FIGS. 1 and 2 to achieve the results of the present invention; and FIG. 5 illustrates a further modification according to the present invention.

FIGS. 1 and 2 illustrate a fan produced commercially by the inventor's assignee and sold under the name "Feather Fan." The overall diameter of this fan is 7 inches and its depth is approximately 2½ inches. The fan is capable of delivering up to 270 cu.ft/min and is employed for cooling electronic equipment such as computer consoles, relay racks, power supplies and the like. The present invention will be described as applied to the specific structure of the illustrated fan, but it will be understood that the principles of the invention are applicable to other types of gas or air moving devices in which vortex noise occurs, of which the Feather Fan is representative.

As shown in FIGS. 1 and 2, the fan assembly includes a venturi ring or shroud 10 within which the fan assembly, indicated generally at 12, is supported by a plurality of radially extending struts 14. The struts 14 support at their inner ends a stator hub 16, which carries the stator of an electric motor to drive the fan blades.

A rotor hub 18 carries a plurality of fan blades 20 (three in the fan illustrated) spaced at equal angular distances from each other about the hub. The entire rotor structure of the motor, including the rotor hub and blades, is journaled in suitable bearings and secured for rotation relative to the stator structure. Thus, the struts 14 support the entire motor and fan blade assembly within the venturi ring 10. The fan assembly of FIGS. 1 and 2 produces a flow of air in an axial direction, indicated by the horizontal arrows in FIG. 2 in response to rotation of the blades 20 in the counter-clockwise direction as indicated in FIG. 1. The legend 20a denotes the leading edge of the blade 20 while 20b denotes the trailing edge.

As briefly referred to above, fan blades of the type illustrated in FIGS. 1 and 2, but without the notched edges illustrated therein, give rise under certain operating conditions to noise caused by vortex shedding. This noise results from the aerodynamic characteristics of the blade and is a function of the velocity of flow leaving the blade, the blade thickness and the pressure differences between the suction and high pressure surfaces of the blade. These characteristics produce vortices at the trailing edges of the blade which are manifested by fluctuating pressures, the fluctuations of which occur at frequencies in the audible range. If the trailing edge of the blade is continuous, i.e., a smooth, unbroken line, these pressure fluctuations occur within a narrow range of frequencies, centered about a relatively high audible peak frequency (e.g., 2000 Hz), and are of sufficient intensity to become annoying.

According to the present invention, this vortex noise is reduced by physically altering the shape of the blade to disturb the air patterns at discharge such that the fluctuations resulting from vortex flow occur at relatively similar, and low, intensities over a wide range of frequencies, rather than essentially at a single peak frequency. Referring to FIG. 1, the physical deformation takes the form of a series of notches 21, in this case V-shaped, formed in the trailing edge 20b of the blade. Because of these notches, the vortex shedding does not start in regular fashion along the trailing edge of the blade, as would occur in the conventional blade, but rather irregularly, all along the edges of the notches. This increases the shedding length and results in changes in the vortex intensities leaving the blade, the strongest vortices occurring at the roots of the notches and the weakest vortices at the crests.

The result of this mixing of vortex intensities is to establish a turbulence condition along the trailing edges of a blade. The irregular pressure fluctuations occurring in such a turbulence condition are at frequencies spread over a relatively broad frequency band, without significant amplitude peaks at any single frequency. This broad banding then, has the effect of lessening the intensity of noise at the undesired relatively high frequency to a tolerable level.

The notching of the invention may be applied to blades having a constant thickness, such as that shown in FIG. 2, or to blades having an airfoil cross section. On a blade of the latter type, the effect of the notches is to produce a variation in the thickness in the trailing edge and, since the peak frequency of vortex shedding noise is a function of this thickness, the unevenness helps to reduce noise at the annoying frequency.

It has been found that the noise reduction effect of the notching is optimized if the notches are of equal size and constant pitch along the blade edge. As applied to the Feather Fan illustrated in FIGS. 1 and 2, it has been found that notches having a depth of approximately 0.25 inch, a width at the blade edge of 0.3 inch and a crest width of 0.1 inch results in optimum noise reduction. The precise dimensions will of course vary with the characteristics of the fans and blades to which the invention is applied.

The present inventor has also found that the noise reduction resulting from the blade edge notching may be enhanced if the series of notches in respective blades are off-set or staggered relative to one another so as to create different flow patterns on the respective blades. This is illustrated in FIG. 1 wherein the series of notches in the trailing edges of the blades 20, while all of the same pitch and dimensions, are longitudinally displaced along the edge of the blades from each other by an amount less than the pitch of the notches. By so staggering the starting point of the series of notches on the respective blades, repetitive flow patterns, which could reinforce and give rise to an undesirable noise component, are avoided.

In the specific example illustrated, i.e., the Rotron Feather Fan, it was found that noise centered at approximately 2000 Hz occurred at objectionable intensities under certain operating conditions. By provision of the notching as illustrated in FIG. 1, i.e., V-shaped notches of the dimensions given above, with the series of notches longitudinally displaced from each other on the respective blades, the noise reduction at this frequency was on the order of 10 db. Although some reduction in fan performance resulted from the turbulence caused by the notching, it was relatively small and well worth the noise reduction for which it was traded.

In FIGS. 3 and 4 are illustrated other form of notching which may be used in accordance with the invention. In FIG. 3, the roots of the notches are essentially U-shaped and the crests rounded in the same manner to provide rounded notching. In FIG. 4, the notches are rectangular cut-outs formed in the trailing edge. In the cases of both types of notching, the dimensions are essentially those given hereinabove with respect to the V-shaped notches shown in FIGS. 1 and 2.

In the embodiments of FIGS. 1 to 4, the notching of the trailing edges of the blades extends over the entire length of the edge, i.e., from root to tip. The inventor has found that substantial vortex noise reduction can be obtained with the notching extending only about half way from the tip to the root, as shown in FIG. 5. While slightly less effective in noise reduction than full length notching, the half length notching results in less performance loss, the loss being neglible compared to an un-notched standard blade.

I claim:

1. A reduced noise fluid moving device comprising a plurality of blades rotatable in unison about an axis to cause fluid flow in a direction generally parallel to said axis, each of said blades having leading and trailing edges with respect to the direction of fluid flow, the trailing edge of each of said blades having a series of notches along its length to cause turbulence conditions as the fluid leaves the blade, the notches in all of said blades being of equal size and constant pitch and the series of notches along the edges of respective ones of said blades being longitudinally displaced from each other by an amount less than the pitch of said notches.

2. The device of claim 1 wherein said notches are V-shaped.

3. The device of claim 1 wherein said notches are U-shaped.

4. The device of claim 1 wherein said notches are rectangular in shape.

5. The device of claim 1 wherein said notches extend along the entire length of said blade edge.

6. The device of claim 1 wherein said notches extend along said blade edge partway from the tip of the blade toward its root.

7. A reduced noise air moving fan comprising a hub adapted to be rotated about an axis, a plurality of fan blades secured to the periphery of said hub at equiangularly spaced points thereon, each of said blades having leading and trailing edges with respect to the direction of air flow produced by rotation of said blades, a series of V-shaped notches of equal size and constant pitch formed in and extending along the length of the trailing edge of each of said blades, the series of notches in the trailing edge of each blade being displaced longitudinally along the blade with respect to the series of notches in the trailing edges of the other blades, thereby to engender turbulence conditions at the trailing edges of the blades exhibiting pressure fluctuations varying over a relatively wide frequency range.

8. A fluid moving device with reduced noise generation resulting from vortex shedding, comprising,
a plurality of blades rotatable about an axis to cause fluid flow in a direction generally parallel to the axis, each of said blades having leading and trailing edges with respect to the direction of fluid flow,
a plurality of notches integrally formed in each of said blades along the trailing edge thereof,
the notches in each blade having crests lying along a line which, if constituting the actual trailing edge of the blade, would engender vortex shedding therealong and give rise to undesired pressure fluctuations within a predetermined narrow range of audible frequencies during operation of the blade,
said notches extending inwardly of said blade from said line and increasing the effective vortex shedding length of the trailing edge as compared to the length of said line, thereby reducing said undesired pressure fluctuations,
the plurality of notches in each of the blades being disposed along its trailing edge differently than the plurality of notches along the trailing edge of each of the other blades.

* * * * *